June 10, 1958 C. R. EKHOLM 2,837,810
METHOD OF PRODUCING FITTINGS
Filed June 17, 1955 5 Sheets-Sheet 2
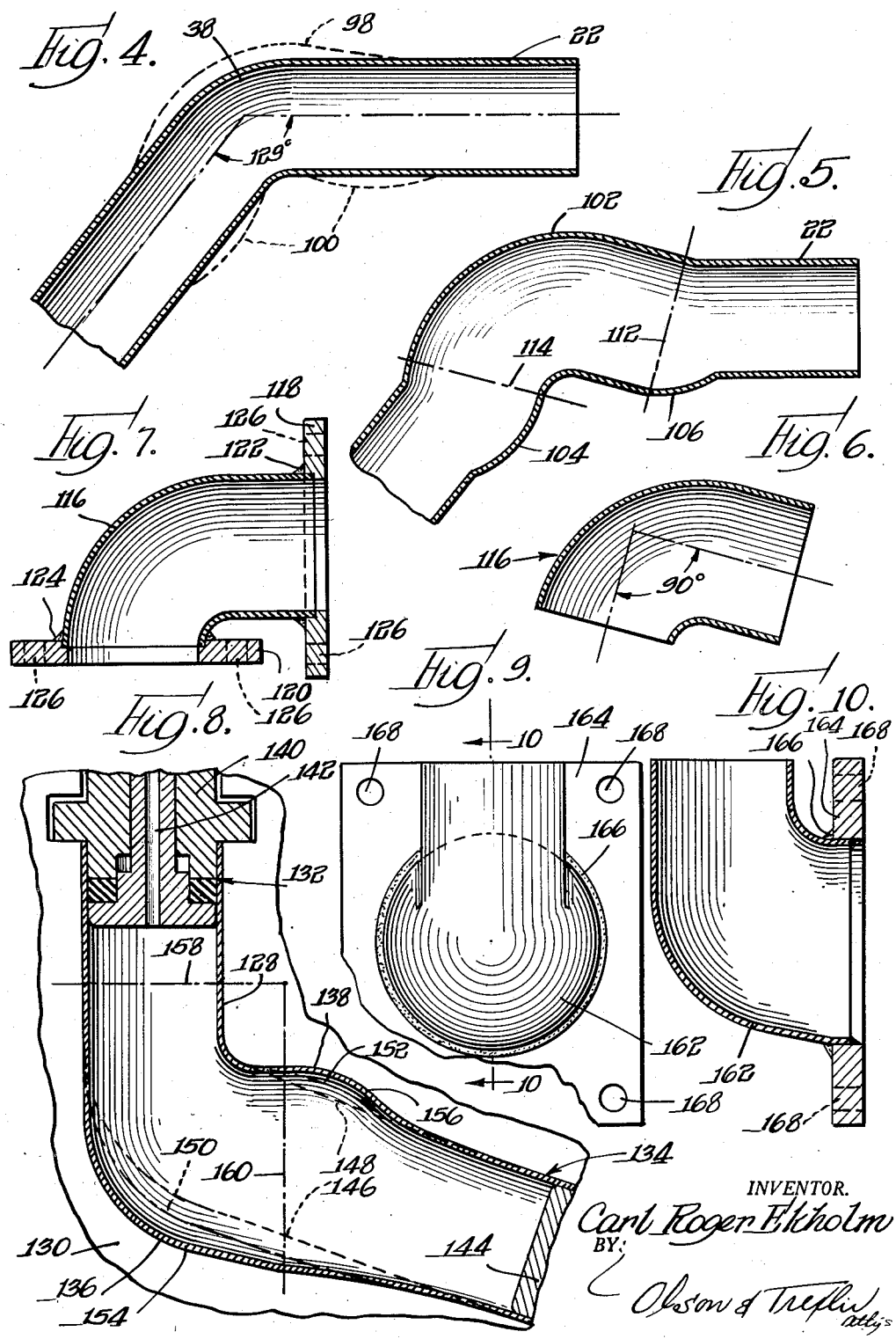
INVENTOR.
Carl Roger Ekholm
BY
Olson & Trexler
attys

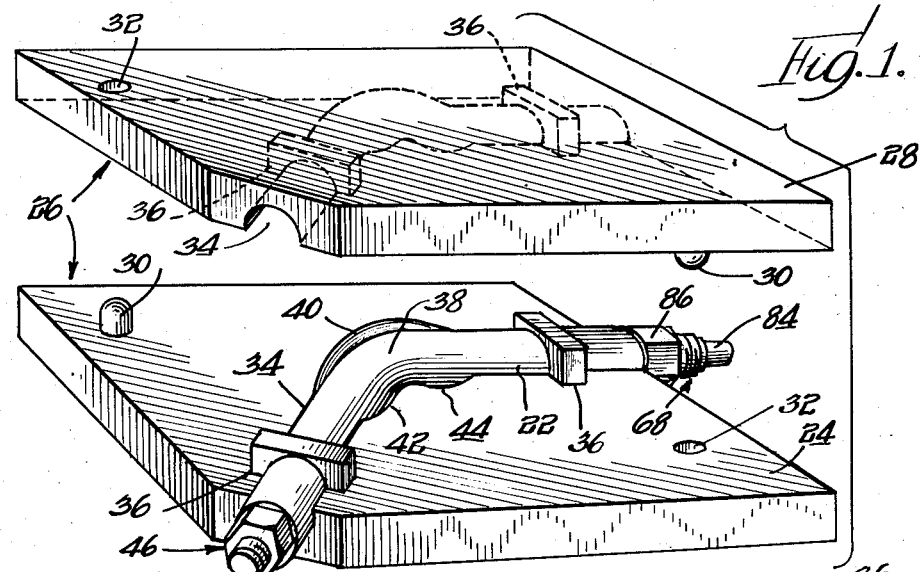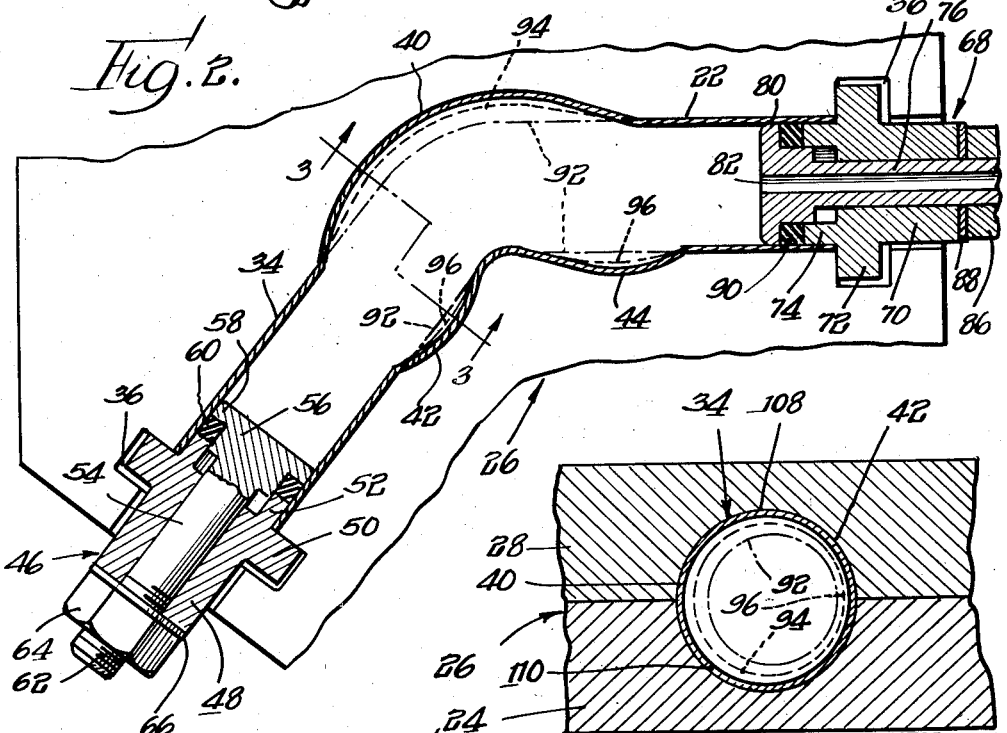

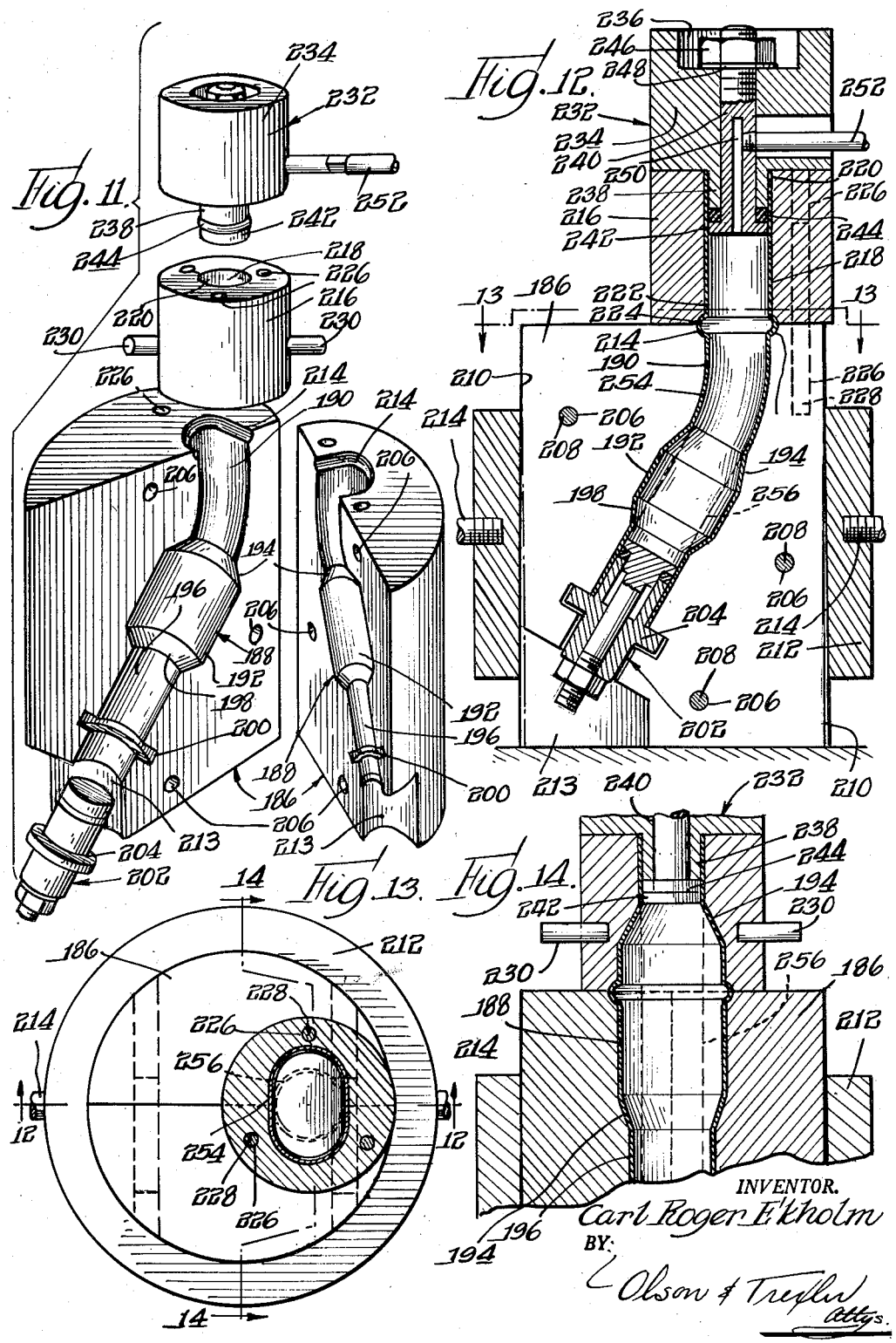

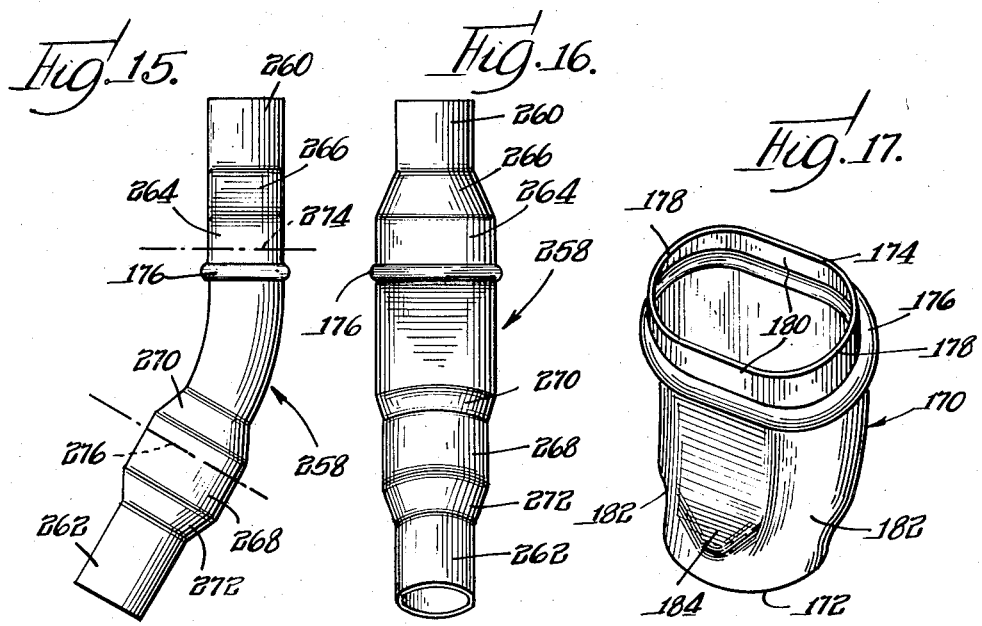
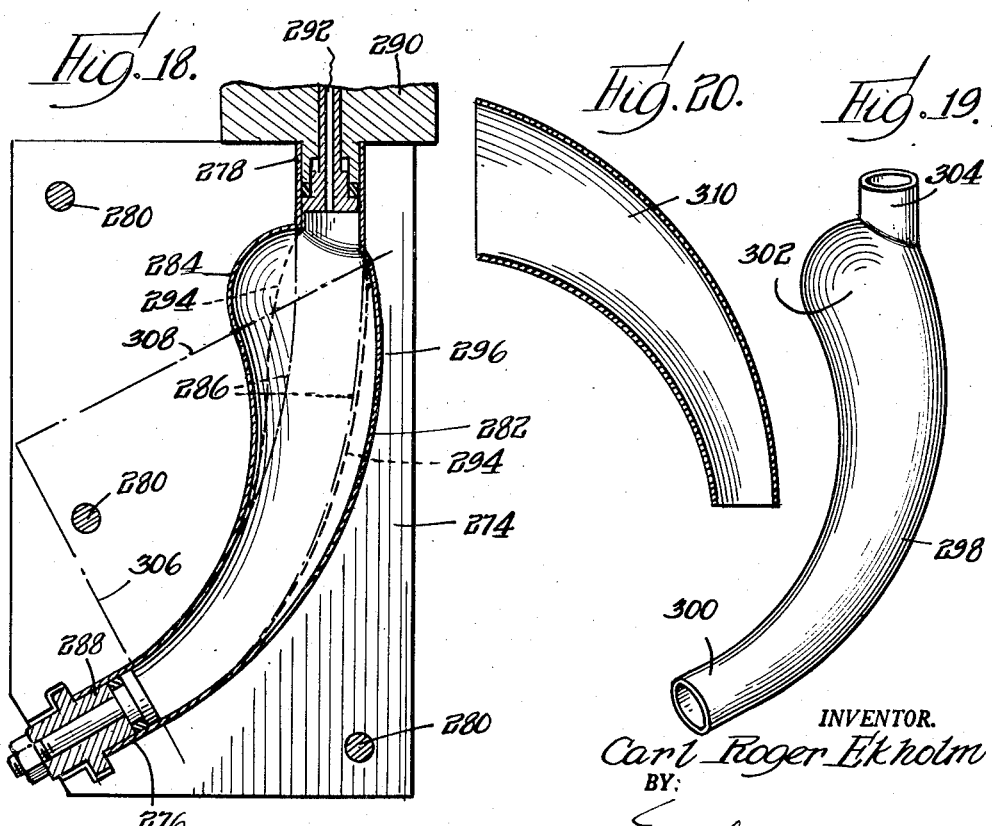

June 10, 1958 C. R. EKHOLM 2,837,810
METHOD OF PRODUCING FITTINGS
Filed June 17, 1955 5 Sheets-Sheet 5
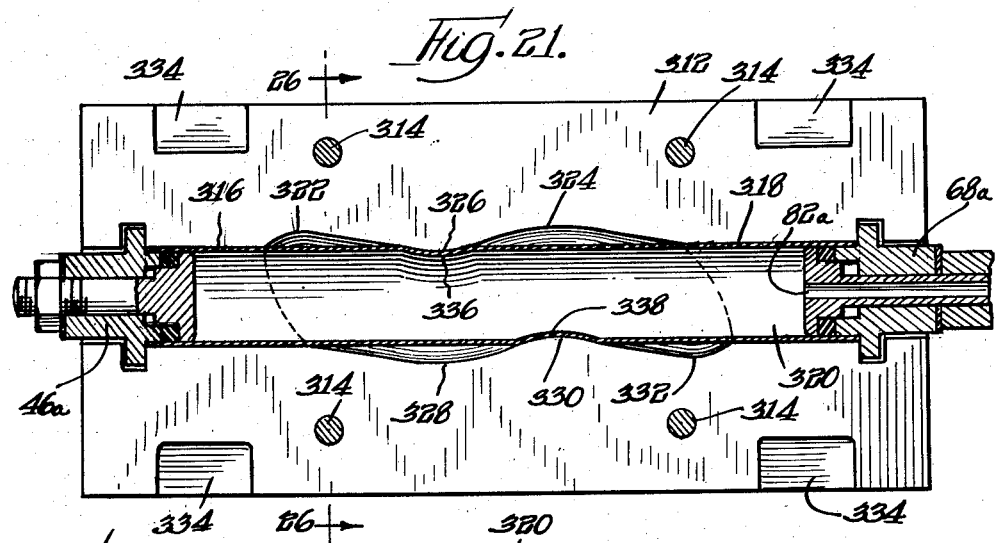
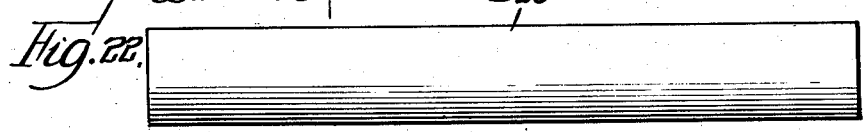
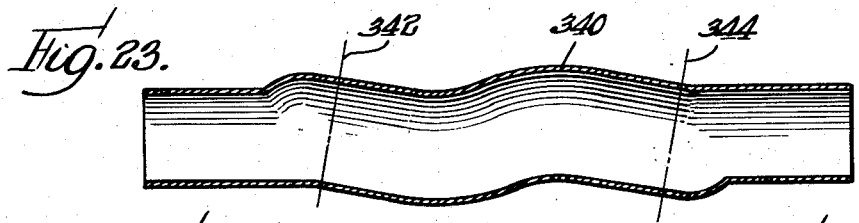
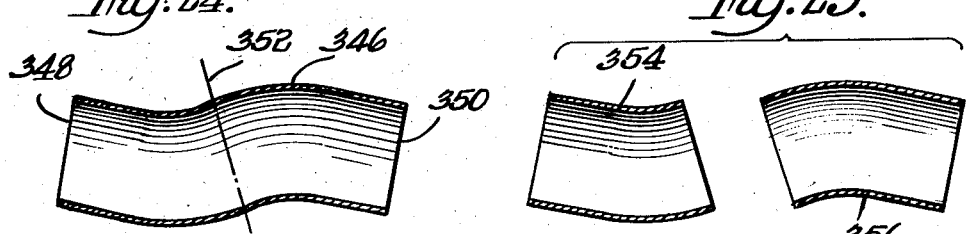
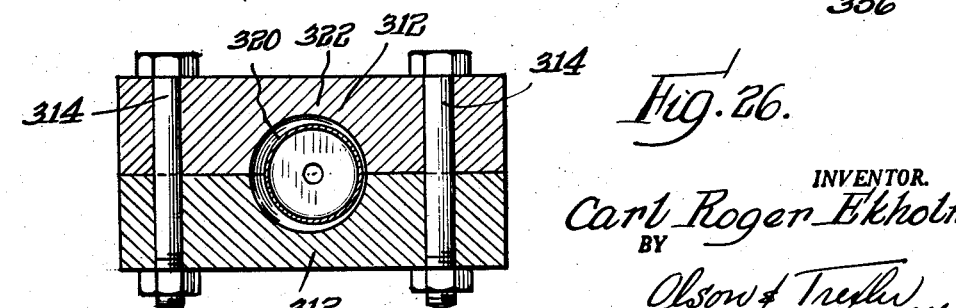
INVENTOR.
Carl Roger Ekholm
BY
Olson & Trexler
attys.

United States Patent Office 2,837,810
Patented June 10, 1958

2,837,810

METHOD OF PRODUCING FITTINGS

Carl Roger Ekholm, Elgin, Ill., assignor to Flexonics Corporation, Maywood, Ill., a corporation of Illinois Application June 17, 1955, Serial No. 516,263

6 Claims. (Cl. 29—157)

This invention is concerned generally with the formation of tubing and the like, and more specifically with the production of bends and special shapes therein.

Heretofore, in order to produce special shapes or unusual bends for pipes, tubing or the like, it has been the custom either to cast the parts, or to form them from a plurality of parts which are welded or brazed together. This is true because the pipes for tubing, particularly of the thin wall variety, have not been capable of bending or forming to many shapes. For example, right angle bends in thin wall tubing cannot be made by prior art practices about a radius less than the diameter of the tube. Furthermore, it has not been possible to form a tube into various special shapes such as a right angle reducing coupling, or a coupling from one shape of tubing to another and incorporating a bend therein. The primary difficulty in mechanical bending of tubing is that the outer wall stretches, while the wall on the inside of the bend is compressed. When a rather sharp bend is made, the wall on the outside of the bend thins out and tends to flatten, thereby distorting the cross section of the tube. The outer wall of the tube actually will rupture if the bend is made too small a radius. At the same time the inner wall may crimp and thereby form a flow passage which is not smooth.

Heretofore, as has been noted, such special bends and shapes often have been produced by casting. Castings often are not satisfactory inasmuch as they are sufficiently porous as to leak when in high pressure installations. Furthermore, they are quite heavy, thereby precluding their use in aircraft and in other installations where light weight is a prime requisite.

Special shapes and bends also have been produced by welding or brazing together sections of stamped sheet metal. Fabrication in this maner is expensive, and imperfect welds may result in leaks. Furthermore, welding tends to warp sheet metal below a certain thickness. In addition, the welding of the necessary parts together results in seams which render attachment of end fittings difficult. Co-mating dies of hardened steel are necessary to stamp the parts to be welded together. Such dies are difficult and expensive to make.

It is an object of this invention to provide methods of producing seamless fittnigs of thin wall tubing having shapes and bends heretofore impossible to attain.

It is a further object of this invention to produce right angle bends in thin wall tubing wherein the radius of the bend at the center line of the tubing is substantially less than the diameter of the tubing.

A further object of this invention is to produce special shapes and bends of thin wall tubing wherein the tubing throughout the special shape or bend is of substantially uniform wall thickness.

Yet another object of this invention is to provide methods of attaining bends and special shapes of thin wall tubing fittings wherein all of the walls are in tension.

Another object of this invention is to provide methods of producing apparent bends in thin wall tubing which are greater than the actual physical bends.

More specifically, it is an object of this invention to provide a method of forming bends and special shapes of thin wall tubing by mechanically bending the tubing and thereafter stretching the tubing to the desired shape.

Yet another object of this invention is to provide methods of forming thin wall tubing fittings of special shapes and bends utilizing dies of extremely low cost.

Yet another object of this invention is to provide methods of forming bends and special shapes of seamless thin wall tubing wherein the walls of the tubing are of increased strength in the finished article.

Other and further objects and advantages of the present invention will be apparent from the following description when taken in connection with the accompanying drawings, wherein:

Fig. 1 is an exploded perspective view showing a length of tubing and an associated die for producing a right angle elbow;

Fig. 2 is a longitudinal sectional view through the tubing showing the formation thereof;

Fig. 3 is a cross sectional view taken substantially along the line 3—3 in Fig. 2;

Fig. 4 is a longitudinal sectional view similar to a portion of Fig. 2 showing the tubing before the final forming thereof;

Fig. 5 is a view similar to Fig. 4 after stretching of the tubing to shape;

Fig. 6 is a view similar to Fig. 5 showing the right angle elbow cut from the stretched tubing of Fig. 5;

Fig. 7 is a view similar to Fig. 6 showing attachment flanges welded or brazed on the ends of the elbow of Fig. 6;

Fig. 8 is a longitudinal sectional view similar to Fig. 2 but showing the formation of a reducing elbow;

Fig. 9 is an end view of the completed reducing elbow;

Fig. 10 is a longitudinal sectional view of the completed reducing elbow as taken substantially along the line 10—10 in Fig. 9;

Fig. 11 is an exploded perspective view showing the dies and sealing plugs as utilized for producing a special shape;

Fig. 12 is a longitudinal sectional view of the shape produced by the dies of Fig. 11 showing the tubing in place in the dies;

Fig. 13 is a cross sectional view taken along the line 13—13 of Fig. 12;

Fig. 14 is a longitudinal sectional view taken substantially along the line 14—14 of Fig. 13;

Fig. 15 is a side view of the special form produced in Figs. 11–14;

Fig. 16 is a plan view of the form of Fig. 15 taken substantially at right angles thereto;

Fig. 17 is a perspective view of the fitting cut from the form of Figs. 15 and 16;

Fig. 18 is a longitudinal view through a length of tubing generally similar to Fig. 2 but illustrating the formation of a different type of reducing elbow;

Fig. 19 is a perspective view of the tubing form shown in Fig. 18;

Fig. 20 is a longitudinal sectional view of the reducing elbow cut from the section of tubing shown in Fig. 19;

Fig. 21 is a view similar to Fig. 2 showing the formation of a compound bend;

Fig. 22 is a plan view of the tubing used in Fig. 21;

Fig. 23 is a longitudinal sectional view of the formed tube before cutting thereof;

Fig. 24 is a longitudinal sectional view of the completed compound bend;

Fig. 25 illustrates the formation of two elbows from the compound bend; and

Fig. 26 is a cross sectional view of the die and tube along the line 26—26 in Fig. 21.

The formation of a 90° elbow is illustrated in Figs. 1-7, and reference first should be had to these figures. In order to form an elbow of thin wall tubing, preferably of stainless steel, the tubing first is bent by any known or conventional means such as by mechanical bending to an obtuse angle which is substantially greater than 90°. Thus, in Fig. 4 a section of tubing 22 is illustrated as bent to an included angle of 129°, referred to in the trade as a 51° bend. The radius of the center line of the bend is somewhat less than the diameter of the tubing, and this is possible only by virtue of the fact that the bend has an included angle of substantially greater than 90°. It would be impossible to continue the bend illustrated in Fig. 4 to 90° in accordance with conventional practices.

The section of tubing 22 is placed in the lower half 24 of a forming die identified generally by the numeral 26. The die also includs an upper half or section 28 which is aligned with the lower half by means of suitable dowels or protuberances 30 and cooperating bores or recesses 32. The two halves of the die are pressed together in a hydraulic press, or otherwise are held together by any suitable means. The die, as hereinafter will be brought out, is subject to only more or less static internal stresses. It need not withstand shock forces, and accordingly it need not be made of expensive, hardened steel. In fact, the die 26 satisfactorily can be made of plastic reinforced with glass fibers.

The section of tubing 22 is circular in cross section, and is cylindrical prior to the formation of the initial bend therein. The halves 24 and 28 of the die 26 are provided with complementary or mirror image forming recesses 34 which are shaped to receive the bent section of tubing 22. The recesses 34 near their opposite ends are cylindrical in nature snugly to hold the corresponding portions of the bent section of tubing 22. The recesses 34 near their opposite ends are provided with cross recesses 36 for purposes hereinafter to be set forth. At the bend 38 in the tubing the recesses 34 are enlarged on the outside of the bend to form a bulbous portion 40, while on the inside of the bend the recesses are enlarged in two positions to provide a pair of similar bulbous portions 42 and 44. The bulbous portions 42 and 44 are connected circumferentially of the recesses with the bulbous portion 40 in order to provide a substantially circular cross section at any point in the finished elbow. This circumferential connection will be noted in Fig. 3.

A plug 46 is secured within the left end of the bent section of tubing as viewed in Figs. 1 and 2. This plug comprises a generally cylindrical portion 48 having a rectangular flange 50 thereon, the flange 50 fitting in the recess 36 at the front corner of the die, and the cylindrical portion 48 fitting in the extremity of the recess 34. The plug further includes a cylindrical sleeve or projection 52 integral with the cylindrical portion 48 and the flange 50.

A piston rod 54 extends axially through the cylinder 48, flange 50 and projection 52, and is provided at its outer end with an integral cylinder 56 having a head 58 of greater diameter thereon. A rubber ring 60 encircles the piston 56, and lies between the head 58 thereof and the end of the cylindrical protuberance 52. The outer or extending end of the piston rod 54 is threaded as at 62, and a nut 64 is threaded thereon, a washer 66 being interposed between the nut and the end of the cylindrical portion 48. When the nut 64 is tightened on the threads 62 of the piston rod 54, the head 58 is pulled toward the protuberance 52 and the rubber ring or gasket 60 is tightly compressed. As a result, the ring expands raidally outwardly and impinges firmly against the inside of the tubing section to force the tubing tightly against the walls of the recess 34. The tightening of the nut 64 on the piston rod is done after clamping together of the two die halves 24 and 28. The plug 46 locks tightly against the wall of the tubing by virtue of the expansion of the ring 60, while the plug flange 50 received in the cross recess 36 positively anchors the plug, and hence the tubing, against longitudinal movement.

A similar plug 68 is provided at the opposite end of the tube. This plug includes a cylindrical portion 70, a flange 72 and a protruding cylindrical portion 74. A piston rod 76 extends through the cylinder 70, flange 72, and projection 74 and is integral at its outer end with a piston 78 having a head or flange 80 thereon. A bore 82 extends through the piston 78 including the head 80 thereon and also through the piston rod 76 to the end thereof where it is connected by means of a suitable hydraulic fitting to a high pressure hydraulic hose or line 84. A nut 86 is threaded on the outer end of a piston rod and bears against a washer 88 to provide for clamping a rubber ring or gasket 90 between the head 80 and cylindrical projection 74 to force the ring outwardly against the walls of the tube 22 whereby to lock the end of the tube to the plug, the plug in turn being anchored by the flange 72 fitting in the cross recess 36. Thus, the opposite ends of the tube are anchored and means is provided for applying hydraulic fluid under pressure to the inside of the tube.

With the tube 22 bent to the obtuse angle illustrated in Figs. 1 and 4, and as indicated in the broken line at 92 in Fig. 2, hydraulic fluid under pressure is introduced through the hose 84 and the bore 82 to the interior of the tube. Water conveniently can be used as the hydraulic fluid. The hydraulic pressure on the inside of the tube causes the tube, which preferably has been annealed after the initial formation of the obtuse bend, to expand outwardly past the dashed line position indicated at 94 in Fig. 2 to the full line position in the bulge 40 in the die. Simultaneously, the material forming the tubing wall on the inside of the bend expands past the dashed line position indicated at 96 to the full line position in the enlargements or bulges 42 and 44. This shape of the tubing is illustrated by the dashed lines 98 and 100 in Fig. 4, and the tubing 22 as expanded in this manner is shown both in Figs. 2 and 5.

In addition to the original cylindrical portions of the tube and the bend therein, the tube or tubing 22 includes a bulge 102 on the outside of the bend, and a pair of bulges or enlargements 104 and 106 on the inside of the bend.

In conventional bending the thinning of the tubing on the outside of the bend is more or less localized. In the process herein described the stretching and thinning of the tubing is not only in the local area at the point of the initial bend but also extends throughout the length of the enlargement 40 in the die recess. Thus, the stretching and thinning of the tube takes place over a materially greater length than in accordance with conventional practice, and the danger of rupture of the tubing on the outside of the bend is eliminated.

At the same time the material forming the tubing wall on the inside of the bend is stretched to form the bulges 104 and 106 respectively expanded into the enlargements 42 and 44. Thus, the initial compression on the inside of the bend is converted to tension, and the entire finished section of tubing is under tension in the bend area. Since the wall on the inside of the bend initially was under compression, the subsequent stretching thereof does not tend to rupture the wall and furthermore eliminates any tendency to crimp the wall that might originally have been present.

Simultaneously, the tubing is expanded upwardly and downwardly into the die halves where the enlargements 40, 42 and 44 are joined as at 108. As a result, the cross section 110 of the tubing throughout the bend area ends up circular in form.

Stainless steel is possessed to a marked degree of the characteristic that it increases in tensile strength upon stretching and fitting. Specifically, in the case of thin wall tubing, and within certain limits, the tensile strength of the tubing wall increases more rapidly than the reduced cross sectional area tends to weaken the tubing. Accordingly, when stainless steel tubing is expanded in the manner just disclosed, an increment of expansion causes the tensile strength to increase sufficiently so that all of the tubing must expand to the same degree before further expansion can continue in the initial location. Thus, bubbles which might cause rupture of the tubing are avoided. Although the dies naturally limit this characteristic to some degree, the expanded tubing is substantially stronger than the initial tubing by virtue of this cold working of the tubing. Other metals possess this characteristic to some extent, but stainless steel possesses it to an outstanding degree, and it therefore will be understood that stainless steel is the preferred material for the tubing discussed herein.

Subsequent to the expanding operation just discussed, the hydraulic pressure is removed, the die halves 24 and 28 are separated, and the plugs 46 and 68 are removed from the ends of the section of tubing. The tubing then is cut off along a plane 112 extending through the bulge 102 near its right hand junction with the original section of tubing 22 and through the bulge 106 somewhat to the right of the mid-section thereof. This plane 112 is at right angles to the walls of the tubing in the bend area.

The tubing also is cut off along a plane 114 at right angles to the tubing wall and on the opposite side of the bend from the plane 112. The plane 114 extends through the bulge 102 near the left end thereof and through the bulge 104 near the inside of the bend. The planes 112 and 114 are mutually perpendicular, and the cut off section of tubing forms an elbow identified by the numeral 116 in Fig. 6 wherein the center lines of the opposite ends of the elbow form a 90° angle relative to one another as is indicated in Fig. 6. It will be observed that the effective radius of the bend is substantially less than the diameter of the elbow 116. Flanges 118 and 120 are welded or brazed on the opposite ends of the elbow 116 as is indicated at 122 and 124. These flanges are provided with bolt holes as at 126 to provide for attaching the elbow to adjacent sections of tubing. The flanges 118 and 120 may be of any desirable cross section in accordance with the requirements of a particular installation.

In accordance with the invention disclosed herein a reducing elbow can be made as is illustrated in Figs. 8, 9 and 10. In this case a uniform cylindrical section of tubing is bent to an obtuse angle by any suitable or known means such as a mechanical bender. In this instance the bend is made somewhat sharper than in the example previously described, being a 70° bend having an inclined angle of approximately 110° The bent section of tubing, hereinafter identified by the numeral 128, is placed in a split confining die 130. This die, like the die 26 previously disclosed, can be made of plastic reinforced with glass fibers, or it can be made of steel if it is so desired. It will be apparent that other metals also would be suitable for making the die. The die conforms to the bent section of tubing substantially at the opposite ends thereof as is indicated at 132 and at 134. On the outside of the bend the die is provided with an enlarged recess as indicated at 136. On the inside of the bend there is also provided an enlargement of the recess as at 138, it being understood that enlargements 136 and 138 are connected circumferentially of the tubing section in order to produce a circular cross section at any point in the finished tubing elbow as hereinafter will be seen. The lack of symmetry of the die about the center of the bend is marked in this instance, but it will be observed upon close inspection that dissymmetry also prevails in the previous embodiment of the invention, although to a lesser extent.

The tubing is sealed at one end by a plug 140 similar to the plug 68 previously described, and having a hydraulic passage 142. The section of tubing is sealed at the other end by a plug 144 similar to the plug 46 previously described.

The initial position of the pre-bent tube in the restraining die is shown at 146 on the outside of the bend and at 148 on the inside of the bend. Hydraulic fluid, conveniently water, under pressure is introduced into the tube through the bore or passage 142 in the plug 140. This expands the tube to the outside of the bend toward the dashed line position indicated at 150, and on the inside of the bend toward the dashed line position indicated at 152. At this point, the hydraulic pressure may be released, and the tube may be removed from the die for annealing. Similarly, with regard to the embodiment of the invention disclosed in Figs. 1–7, the tube could be removed for annealing when reaching the position indicated by the dashed lines 94 and 96. However, in both embodiments it is not always necessary to anneal the tube at this intermediate step. In any event, expansion by the application of further internal pressure is continued until the tube is expanded out into the enlargements of the recesses as indicated at 154 and at 156 in Fig. 8.

Following this complete expansion the tube is relieved of hydraulic pressure and is removed from the die. The tube then is cut off along a plane indicated at 158 transverse to the axis of the tube in the portion 128 of its original dimension. The tube also is cut off along a plane 160 forming a right angle with the plane 158 and extending through the bulge 156 and the bulge 154 in the tube. The cross section along the plane 160 is circular, and the tube at this point is of substantially larger diameter than along the plane 158.

The cut off section of bent and formed tube thus forms a reducing right angle elbow 162. An attachment plate or flange 164 is welded or brazed on the large end of the elbow as at 166. This plate or flange conveniently is rectangular in outline and is provided with a plurality of bolt holes 168 for attachment to another section of tubing, or any other suitable device or apparatus. No attaching plate or flange has been shown as attached to the opposite end of the elbow, and it will be understood that any conventional fitting can be used at this position. Indeed, the tubing at the small end of the elbow could be cut off along a plane farther along the tube than the plane 158, thereby providing a relatively long length of tubing of the initial diameter. The important thing is that a right angle elbow is produced which is bent to an extremely small diameter, and which is a reducing elbow in nature, being substantially larger at one end than at the other. An important feature of this elbow, like the elbow disclosed in Figs. 1–7, is the stretching of the metal on the inside of the bend, thereby eliminating any thickening or crimping of the metal effected by the initial bend. Also, on the outside of the bend the metal is stretched over a large area of the tube rather than over a restricted length thereof as in prior art bending. Thus, there is no danger of rupture of the outside bend area of the tube either during the bending operation or in high pressure use. It will be appreciated that the metal on the sides of the bend also is stretched in expanding into the enlarged end of the elbow. Thus, all of the metal in the bend area is under tension, and is strengthened through cold working thereof. The elbow may be annealed after completion, as may be the first elbow disclosed, but this step generally is not necessary.

The applicability of the present invention in the formation of a seamless transition elbow is disclosed in Figs. 11–17. Before describing the process, it is thought that attention should be directed to the finished transition elbow in Fig. 17 in order best to explain the process. The transition elbow 170 shown in Fig. 17 forms a shallow obtuse angle. In a specific example, the apparent bend is slightly less than 30°, the center lines of the opposite ends of the elbow forming an included angle of somewhat over 150°. One end of the elbow is circular in cross section as at 172, while the other end is oval or oblong as at 174. A bead 176 is provided adjacent the oval end 174 for attachment purposes. The oval configuration is such that the edges thereof are substantially semi-circular in nature as at 178, while the walls between the edges are substantially flat as at 180. The transverse dimension between the semi-circular edges or ends 178 decreases so that these edges or ends merge smoothly into the circular end as at 182, while the substantially flat surfaces merge smoothly into the circular end as at 184.

In order to form the transition elbow of Fig. 17 there is provided a split die 186 having two halves forming mirror images of one another. Each die is provided with a recess indicated generally by the numeral 188, and these recesses cooperate to form a curved section 190 of generally oval cross section similar to the end 174 of the transition elbow. The recess 188 also includes an enlarged cylindrical or barrel portion 192 corresponding in diameter to the circular end 172 of the transition elbow. The sections 190 and 192 join at a compound section 194 in which the transverse dimension of the section 190 is reduced to meet the diameter of the section 192, while the height of the section 190 is increased to meet the diameter of the cylindrical section 192.

The cylindrical section 192 is joined to a tubular section 196 by a frusto-conical section 198, and a transverse recess, or cross recess 200 is formed near the outer end of the tubular recess section 196. A plug 202 similar to the plug 46 previously disclosed and having a circular flange 204 received in the cross recess 200 anchors the end of a tubing section as will be disclosed hereinafter.

A plurality of apertures, conveniently three in number, and identified by the numeral 206 is provided in the opposite halves of the die 186 for aligning the two halves, dowels 208 being inserted in these holes to hold the die halves in proper alignment.

The outer surface of the die when in assembled relation is generally cylindrical in nature, but is tapered substantially one degree as is indicated at 210. A solid cylindrical ring 212 having an internal configuration complementary to the external configuration of the die wedges over the outside of the die to hold the two halves thereof in proper assembled relation. The ring conveniently has a pair of studs 214 threaded into it for securing handles or other desirable structure for handling the ring.

The die 186 is cut away at one end as at 213 to provide clearance for the plug 202 as will be apparent. At the opposite end of the die the oval section 190 of the recess 188 is provided with a more or less beveled section 214 forming a quarter circle in longitudinal section to define half of the bead 176 of the transition elbow. A reciprocating die 216 is provided with a bore or recess 218 ranging from circular configuration at its outer end at 220 to an oblong cross section at its opposite end at 222 joining the section 190 and having a more or less beveled section 224 completing a semi-circular shape with the beveled section 214 to produce the bead 176.

Reciprocating die 216 is aligned with the die 186 by means of aligning apertures 226 and cooperating dowel pins 228. The reciprocating die 216 also is provided with a pair of radially extending dowels 230 for handling the reciprocating die, which for instance might be gripped in a press for holding it tight against the split die 186.

A plug 232 is provided for use with the reciprocating die 216, and this plug comprises a rather large cylindrical block 234 having a recess in the upper end thereof as at 236, and having a cylindrically projecting neck 238 at the lower end. A piston rod 240 extends through a central bore in the block 234 and is provided at its inner end with a piston 242. A rubber or the like ring 244 encircles the piston rod 240 between the end of the neck 238 and the piston 242, and this ring is deformed outwardly against the inner wall of a section of tubing when a nut 246 is threaded on the outer end of the piston rod to clamp a washer 248 against the end of the block 234 within the recess 236. A bore or passage 250 extends longitudinally through the piston 242 and into the piston rod 240, and communicates with a lateral bore connected to a high pressure hydraulic hose or line 252.

A section of cylindrical tubing 254 bent to a shallow obtuse angle, in the current example this angle being slightly over 150° included between the center lines of the ends of the tubing, is placed in the clamp 186 and the reciprocating clamp 216, the initial prebent shape of the tube or tubing being indicated by the dashed lines at 256 in Figs. 12, 13 and 14. It will be understood that the tube initially is prebent to this extent by any conventional bending practices, and preferably is annealed before insertion in the dies. The plugs 202 and 232 then are utilized to seal the ends of the tube, and hydraulic pressure is introduced to the interior of the tube, the hydraulic fluid again conveniently being water.

Application of internal hydraulic pressure to the length of tubing forces the tubing out to the full line position shown in Figs. 12–14 to produce the article identified by the numeral 258 in Figs. 15 and 16. This article is complementary in shape to the recesses in the dies including tubular sections 260 and 262 at the opposite ends thereof corresponding to the initial section of tubing before expanding. The tubing also includes a section 264 of oblong cross section curved longitudinally and joined to the tubular section 260 by a compound curved section 266, and having the bead 176 intermediate its ends. A cylinder or barrel-like section 268 is joined to the oblong section 264 by a compound curved section 270, and the barrel section 268 is joined to the tubular section 262 at the end by a frusto-conical section 272. The oblong section 264 is cut off along a plane as indicated at 274 forming a right angle with the axis of the tubing section 260 and also with the longitudinal axis of the oblong section. The cylindrical or barrel section 268 is cut off along a plane 276 perpendicular to the axis of this section. This produces the finished transition elbow previously described and shown in Fig. 17 as item 170.

The metal on the inside of the bend in the transition elbow is stretched during expansion in order to produce the lateral increase in dimension to form the oblong cross section. It also is stretched somewhat in forming the barrel section 268 and connecting part 270. As a result, there is no crimping whatsoever of the inside diameter part of the tubing wall. The entire finished article is cold worked with the advantages attendant thereupon as heretofore discussed, and the finished article may be annealed if desired. The shape is one that heretofore has been thought impossible of formation from seamless tubing.

Production of a somewhat different form of transition elbow or reducing elbow is illustrated in Figs. 18–20. In these figures, a split die again is used, and this die is identified by the numeral 274. The die is provided at one corner with a cylindrical recess 276, and near the diagonally opposite corner thereof is provided with another cylindrical recess 278. The two halves of the die are properly aligned by means of suitable openings and dowel pins 280. A recess extends between the recesses 276 and 278, being bowed outwardly at 282 along the outside of the curve, and having an enlargement 284 on the inside of the curve adjacent the cylindrical section 278.

A section of cylindrical tubing having its initial position indicated by the dashed lines at 286 is inserted in the recesses of the die prior to assembly of the two halves thereof, and the ends of the tubular section are sealed by means of a plug 288 similar to the plug 46 previously described, and a plug 290 similar to the plug 232 previously described, the plug 290 having an axial bore or flow passage 292 for introduction of internal pressure. The initially curved section of tubing is produced by any conventional means or method such as by mechanical bending, and preferably is annealed after such bending. Introduction of interior hydraulic pressure forces the tubing out toward the broken line position 294, and the tubing may be removed and annealed when it has been so partially expanded. Further application of internal hydraulic pressure forces the tubing out to the solid line position indicated at 296. It will be understood that the enlarged recesses 282 and 284 of the die are connected circumferentially of the tubing section in such manner that a cross section perpendicular to the axis of the tubing is at all times circular.

The expanded section of tubing after release of the internal hydraulic pressure and removal of the plugs and removal of the tubing from the die is illustrated at 298 in Fig. 19. The section is more or less gourd-like in configuration, expanding from a minimum diameter at 300 to a maximum diameter at 302, and having a tubular protuberance 304 from the portion of maximum diameter. The ends of the expanded tube 298 are cut off along mutually right angularly disposed planes 306 and 308 indicated in Fig. 18 to produce a right angle reducing or transition elbow as illustrated at 310 in Fig. 20. The cross section taken perpendicular to the axis of the finished elbow 310 is substantially circular at any point, and thereby provides a smooth transition from a tube of large diameter to one of small diameter, or vice versa. Again, the material on the inside of the initial curve is stretched by expansion and counteracts the initial compression thereof whereby to avoid thickening or crimping. The stretching along the outside of the curve occurs over a large area and thereby avoids the local thinning that might cause rupture of the tubing.

Certain types of bends can be made in accordance with the principles of my invention without prebending the tubing. Thus, the formation of a compound bend, or of two elbows is illustrated in Figs. 21–26. In these figures a pair of die halves 312 of complementary shape is capable of being clamped together by means such as pairs of bolts 314 having nuts thereon or threaded into one of the die halves. The two die halves together form at the left end thereof a cylindrical portion 316 and at the right end thereof an aligned cylindrical portion 318. A plug 46a previously described with reference to the plug 46 in Figs. 1 and 2 is expanded within the end of a straight section of tubing 320 of slightly less diameter than the finished item. A plug 68a similar to the plug 68 previously described and having a central bore 82a through which hydraulic fluid is supplied is expanded within the opposite end of the length of tubing 320.

In addition to the cylindrical portions 316 and 318 of the die recesses, the complementary die halves provide an upward bulge 322 toward the section 316, and an upward bulge 324 toward the cylindrical section 318, interconnected by a slight indentation 326. On the diametrically opposite side of the recess provided by the die halves there is a projection or bulbous portion 328 generally opposite to the indentation 326, an indentation 330 generally opposite to the bulbous portion 324, and a bulbous portion 332 adjacent the cylindrical section 320.

Slots 334 also preferably are provided in the die to clamp the die to a work table. It will be understood that clamps could be used to force the two die halves together, and in this case the bolts 314 could be replaced by dowels. When the die halves are clamped about the straight tubing section 320 slight indentations 336 and 338 respectively are formed by the projections or indentations 326 and 330 of the die halves. It will be apparent that with a slightly different configuration of finished part these dents or indentations could be avoided.

After the tubing 320 has been expanded into the die recess or cavity by hydraulic pressure, and after the plugs and die halves have been removed, there is provided an expanded tube 340 as may be seen in Fig. 23. This tube is cut off along the cutting lines 342 and 344 to form the compound bend 346 shown in Fig. 24. The cut ends 348 and 350 are perpendicular to the axes of the compound bend 346 at the cut edges, and the cross section is circular throughout. It will be apparent that flanges or other attaching means could be provided at the ends of the compound bend 346.

Rather than the formation of a single compound bend in the manner just described, the compound bend 346 could be cut along the cutting plane 352 to provide a pair of elbows 354 and 356 as is illustrated in Fig. 25. Each of these elbows could be provided with flanges or other assembling or attaching means as will be apparent.

In the form of the invention just described with regard to Figs. 21–26, all of the finished tubing item is under tension generally as heretofore has been described. The areas on the insides of the bends, particularly at the initially dented portions, are placed under tension by flowing of the metal circumferentially therefrom to make up the increased diameter. For example, a one inch tube might be expanded to a finished one and one-quarter inch diameter. Thus, there are no thickened wall portions, there are no thin wall portions, and the metal is work hardened. Furthermore, special bend shapes can be produced which cannot be produced by prior art mechanical bending means. Since there is no actual bending of the tubing as described in Figs. 21–26, it will be obvious that the apparent bend of the finished article is substantially greater than the initial bend, which in reality is a zero degree bend.

Bends and special shapes are produced by the method hereinbefore described which previously could not be made of seamless sheet metal. The heavy weight and porosity of castings are avoided, and the seams which tend to leak, add weight, and make attachment difficult which heretofore had been present in welded pieces are avoided. In each case material is stretched over a substantial area, and the hydraulic stretching or expanding produces substantially uniform wall thickness. Thus, there are no thin, weak spots which might blow out under high pressure applications. Crimping and thickening along the inside of a curve or along the minimum radius of a bend are avoided by stretching in this area as well as on the outside of the curve.

Various annealing steps may be incorporated in the process, there preferably being an annealing step between the initial bending by mechanical means or otherwise and the start of hydraulic expanding. The hydraulic expansion can be interrupted for an intermediate annealing step if necessary, and an annealing step may be found desirable after completion of expansion. The cold working of the sheet material during stretching strengthens the walls, particularly in the case of stainless steel, and also to lesser extent with various other metals in which the tensile strength increases more rapidly than the wall thins.

In the case of all of the elbows herein disclosed, the initial angle of bend is increased by changing the shape of the tubing. This results in an apparent final bend which is substantially greater than the actual mechanical bend. In fact, bends readily can be produced wherein the center line of an elbow is of substantially lesser radius than the diameter of the tubing, whereas in accordance with prior art practices with thin wall tubing this radius could never be substantially smaller than the diameter.

In addition to producing a more satisfactory finished product, the process herein disclosed is simple and inexpensive. The confining dies need only limit the degree of expansion in various locations, and are not subjected to shock forces or other dynamic forces such as heretofore have been encountered in punching sheet metal to produce multi-piece fittings. Accordingly, the dies can be produced of metals which are relatively easily worked, or can be produced of plastic reinforced with fiber glass. Of course, the dies can be made of steel, and in some instances this may be found to be advantageous.

Various changes in detail will no doubt be apparent to those skilled in the art, but such changes are to be understood as forming a part of this invention insofar as they fall within the spirit and scope of the appended claims.

The invention is claimed as follows:

1. The method of producing right angle elbows for tubing and the like which comprises bending a section of tubing, placing the bent section of tubing in a confining die, sealing the ends of said tubing, stretching the material of the tubing on the outside of the bend and for a substantial distance in each direction therefrom whereby to stretch the material over a large area in the bend vicinity and simultaneously stretching the material in the vicinity of the inside of the bend to counteract the tendency toward compression in the initial bending, such stretching being effected by the application of fluid pressure internally of the sealed length of tubing, relieving such pressure and removing said section of tubing from said die, and cutting off the ends of said tubing along a pair of mutually perpendicular planes, at least one of said planes passing through a stretched part of the tubing.

2. The method as set forth in claim 1 wherein the tubing is bulged outwardly on the outside of the bend in one position in the vicinity of the bend, and the material is bulged outwardly in one position in the vicinity of the inside of the bend, the material circumferentially of the tubing being bulged outwardly interconnecting the inner and outer bulged portions.

3. The method as set forth in claim 1 wherein the material of the tubing adjacent the inside of the bend is bulged outwardly in two positions displaced longitudinally in opposite directions from the bend, and wherein the two cutting planes pass through the two bulges on the inner portion of the tubing whereby to produce a coupling of uniform diameter.

4. The method as set forth in claim 1 wherein the material on the inside of the bend is bulged outwardly in one position displaced longitudinally from the bend, the material of the tubing circumferentially thereof interconnecting the bend on the inside and the bend on the outside being bulged outwardly, and one of said cutting planes passing through the bulge on the inside of the bend and the other cutting plane passing through the tubing displaced from the bulge whereby to produce an elbow of non-uniform diameter.

5. The method of producing a transition elbow of tubing which comprises bending a length of tubing, sealing the ends of said length of tubing, introducing hydraulic fluid under pressure to the interior of said tubing whereby to expand the tubing, limiting the tubing in the vicinity of the bend to expansion laterally of the bend and not along the inside or the outside of the bend, a substantially oval shape thereby being produced in the vicinity of the bend, limiting the expansion in one direction longitudinally of the bend to a substantially cylindrical shape of greater diameter than the tubing before expansion, removing the fluid pressure, removing the sealing means, and cutting off the tubing through two planes, one of the cutting planes being taken in the vicinity of the bend through an oval section of the tubing, and the other section being taken through the cylindrically expanded portion of the tubing whereby to provide an enlarged circular cross section.

6. The method of producing right angle elbows as set forth in claim 1 which comprises initially bending the section of tubing to an obtuse angle, and stretching the material of the tubing while so bent.

References Cited in the file of this patent

UNITED STATES PATENTS

| | | |
|---|---|---|
| 1,542,983 | Bergmann | June 23, 1925 |
| 1,683,123 | Bergmann | Sept. 4, 1928 |
| 1,710,776 | Langenberg | Apr. 30, 1929 |
| 1,884,589 | Davies | Oct. 25, 1932 |
| 1,960,557 | Snyder | May 29, 1934 |
| 1,978,452 | Flodin | Oct. 30, 1934 |
| 2,011,721 | Luff | Aug. 20, 1935 |
| 2,057,916 | Quartz | Oct. 20, 1936 |
| 2,078,195 | Cornell | Apr. 20, 1937 |
| 2,155,080 | Cornell | Apr. 18, 1939 |
| 2,238,038 | Cornell | Apr. 15, 1941 |
| 2,509,782 | Person | May 30, 1950 |